US011795670B2

(12) United States Patent
Tzeng

(10) Patent No.: US 11,795,670 B2
(45) Date of Patent: Oct. 24, 2023

(54) VOICE-CONTROLLED ELECTRONIC FAUCET, VOICE-CONTROLLED ELECTRONIC FAUCET ASSEMBLY, AND VOICE-CONTROLLED ELECTRONIC FAUCET MODULE

(71) Applicant: NCIP INC., Taipei (TW)

(72) Inventor: Rong-Chyan Tzeng, Taipei (TW)

(73) Assignee: NCIP INC., Taipei (TW)

( * ) Notice: Subject to any disclaimer, the term of this patent is extended or adjusted under 35 U.S.C. 154(b) by 717 days.

(21) Appl. No.: 16/943,729

(22) Filed: Jul. 30, 2020

(65) Prior Publication Data

US 2022/0034075 A1 Feb. 3, 2022

(51) Int. Cl.
*E03C 1/05* (2006.01)
*G10L 15/22* (2006.01)
*G10L 21/0232* (2013.01)
*G10L 21/0208* (2013.01)

(52) U.S. Cl.
CPC .............. *E03C 1/057* (2013.01); *G10L 15/22* (2013.01); *G10L 21/0232* (2013.01); *G10L 2015/223* (2013.01); *G10L 2021/02082* (2013.01)

(58) Field of Classification Search
CPC ....... E03C 1/0404; E03C 1/057; G10L 15/22; G10L 21/0232; G10L 2015/223; G10L 2021/02082
See application file for complete search history.

(56) References Cited

U.S. PATENT DOCUMENTS

| 5,868,311 A * | 2/1999 | Cretu-Petra | G05D 23/1393 236/12.12 |
| 8,572,772 B2 * | 11/2013 | Wolf | E03C 1/057 4/678 |
| 10,227,760 B2 * | 3/2019 | Horwitz | G01F 15/06 |
| 11,176,932 B2 * | 11/2021 | Beck | E03C 1/0412 |
| 2020/0354932 A1 * | 11/2020 | Gunawardena | G05B 19/416 |

\* cited by examiner

*Primary Examiner* — Erin Deery
(74) *Attorney, Agent, or Firm* — MUNCY, GEISSLER, OLDS & LOWE, P.C.

(57) ABSTRACT

A voice-controlled electronic faucet assembly includes an electronic mixing valve fluidly connected to a cold water source and a hot water source; a spout; and a control module. The spout is fluidly connected to the electronic mixing valve. The control module without networking function includes a sound receiving component, an echo elimination unit and a processing unit. The sound receiving component receives a sound. The echo elimination unit is coupled to the sound receiving component and processes an echo elimination on the sound. The processing unit is coupled to the echo elimination unit and receives an audio signal after processing with the echo elimination, and performs an offline voice recognition on the audio signal based on a database and generates a comparison result, and outputs a control signal for controlling the electronic mixing valve to perform a corresponding action according to the comparison result.

9 Claims, 5 Drawing Sheets

VOICE-CONTROLLED ELECTRONIC FAUCET, VOICE-CONTROLLED ELECTRONIC FAUCET ASSEMBLY, AND VOICE-CONTROLLED ELECTRONIC FAUCET MODULE

FIELD OF THE INVENTION

The present invention relates to a faucet, and more particularly to a voice-controlled electronic faucet, a voice-controlled electronic faucet assembly, and a voice-controlled electronic faucet module.

BACKGROUND OF THE INVENTION

Faucet is a device used to control water flow. Through installing a water control valve in the faucet and connecting to sources of cold water and hot water, temperature and flow rate of the output water can be changed by adjusting the water control valve.

However, by adjusting the water control valve to control the faucet, there will be problems of bacterial contact or recontamination. With the gradual improvement of people's quality of life, they gradually pay more and more attention to the convenience and diversity of water use. Therefore, how to improve the function and practicability of the faucet is indeed the focus of attention of technicians involved in the field.

SUMMARY OF THE INVENTION

The present invention provides a voice-controlled electronic faucet assembly to improve the convenience of installation and use, and to reduce the cost.

The present invention further provides a voice-controlled electronic faucet to improve the convenience of installation and use, and to reduce the cost.

The present invention further provides a voice-controlled electronic faucet module to improve the convenience of installation and use, and to reduce the cost.

Other objects and advantages of the present invention can be further understood from the technical features disclosed thereby.

The voice-controlled electronic faucet assembly includes an electronic mixing valve, a spout and a control module. The electronic mixing valve is fluidly connected to a cold water source and a hot water source. The spout is fluidly connected to the electronic mixing valve. The control module is without networking function. The control module includes a sound receiving component, an echo elimination unit and a processing unit. The sound receiving component receives a sound. The echo elimination unit is coupled to the sound receiving component and processes an echo elimination to the sound. The processing unit is coupled to the echo elimination unit and receives an audio signal after processing with the echo elimination. The processing unit performs an offline voice recognition on the audio signal based on a database and generates a comparison result. The processing unit outputs a control signal to the electronic mixing valve according to the comparison result for controlling the electronic mixing valve to perform an action correspondingly.

In one embodiment, the aforementioned voice-controlled electronic faucet assembly further includes a near-end sensor, and the near-end sensor is coupled to the processing unit.

In one embodiment, the aforementioned voice-controlled electronic faucet assembly further includes a manual temperature control switch fluidly connected between the electronic mixing valve and the spout.

The voice-controlled electronic faucet includes a body, an electronic mixing valve and a control module. The body includes a cold water inlet, a hot water inlet and a spout. The cold water inlet and the hot water inlet are respectively fluidly connected to a cold water source and a hot water source. The cold water inlet and the hot water inlet communicate with the spout. The electronic mixing valve is disposed in the body. The electronic mixing valve includes a valve body moving relative to the cold water inlet and the hot water inlet to control a fluid from the cold water inlet and the hot water inlet to the spout. The control module without networking function includes a sound receiving component, an echo elimination unit, and a processing unit. The sound receiving component receives a sound. The echo elimination unit is coupled to the sound receiving component and processes an echo elimination to the sound. The processing unit is coupled to the echo elimination unit and receives an audio signal after processing with the echo elimination. The processing unit performs an offline voice recognition on the audio signal based on a database and generates a comparison result. The processing unit outputs a control signal to the electronic mixing valve according to the comparison result for controlling the electronic mixing valve to perform a corresponding action.

In one embodiment, the aforementioned voice-controlled electronic faucet further includes a near-end sensor, and the near-end sensor is coupled to the processing unit.

In one embodiment, the aforementioned voice-controlled electronic faucet further includes a manual temperature control switch fluidly connected between the electronic mixing valve and the spout.

The voice-controlled electronic faucet module includes an electronic faucet and a sensing device. The voice-controlled electronic faucet includes a body, an electronic mixing valve and a first control module. The body includes a cold water inlet, a hot water inlet and a spout. The cold water inlet and the hot water inlet are fluidly connected to a cold water source and a hot water source respectively. The cold water inlet and the hot water inlet communicate with the spout. The electronic mixing valve is disposed in the body. The electronic mixing valve includes a valve body moving relative to the cold water inlet and the hot water inlet to control a fluid from the cold water inlet and the hot water inlet to the spout. The first control module is electrically connected to the electronic mixing valve. The first control module includes a first processing unit and a first transceiver electrically connected to the first processing unit. The sensing device and the electronic faucet are separately disposed. The sensing device includes a sound receiving component, an echo elimination unit, a second processing unit and a second transceiver. The sound receiving component receives a sound. The echo elimination unit is coupled to the sound receiving component and processes an echo elimination to the sound. The second processing unit is coupled to the echo elimination unit and receives an audio signal after processing with the echo elimination. The second transceiver is coupled to the second processing unit. The second processing unit performs an offline voice recognition on the audio signal based on a database and generates a comparison result. The second processing unit outputs a control signal according to the comparison result. The second transceiver wirelessly transmits the control signal to the first transceiver. The first processing unit controls the electronic mixing valve to perform a corresponding action according to the control signal.

In one embodiment, the aforementioned voice-controlled electronic faucet further includes a near-end sensor, and the near-end sensor is coupled to the processing unit.

In one embodiment of, the aforementioned voice-controlled electronic faucet further includes a manual temperature control switch fluidly connected between the electronic mixing valve and the spout.

Based on the above, the voice-controlled electronic faucet, the voice-controlled electronic faucet assembly, and the voice-controlled electronic faucet module perform voice recognition in an offline manner through disposition of the control module and the electronic mixing valve, and are capable of greatly improving the convenience of installation and use thereof, and reducing the cost.

DETAILED DESCRIPTION OF THE PREFERRED EMBODIMENTS

The foregoing and other technical contents, features and efficacies of the present invention will be clearly presented in the following detailed description of a preferred embodiment with reference to the drawings. The control terms mentioned in the following embodiments, for example: on, off, up, down, left, right, front or rear, are only referring to the directions of the attached drawings. Therefore, the control terms used are intended to illustrate rather than limit the invention.

Figure 1:
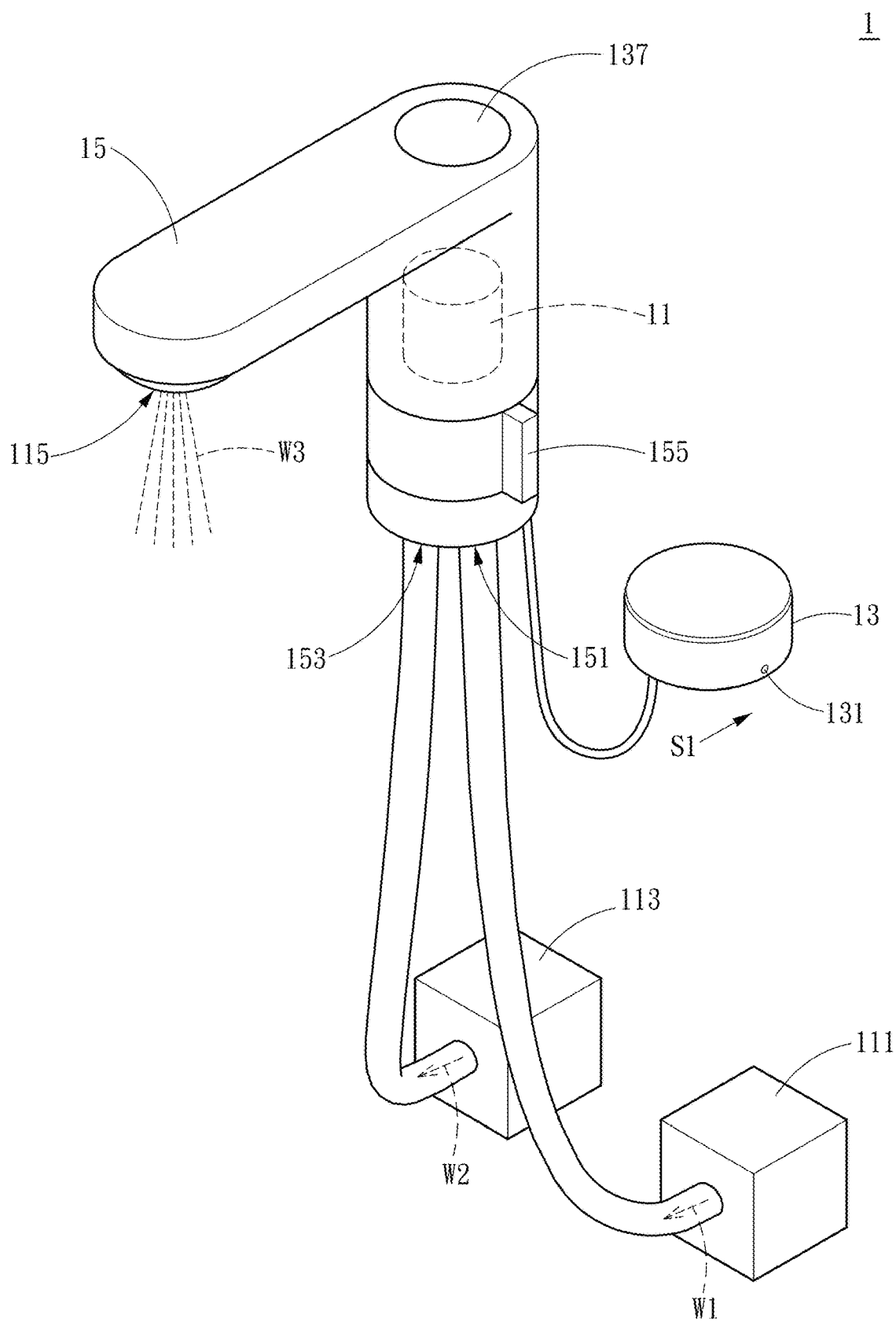
FIG. 1 is a perspective view of a voice-controlled electronic faucet according to one embodiment of the present invention.

Please refer to FIG. 1 for a perspective view of a voice-controlled electronic faucet 1 according to one embodiment. The voice-controlled electronic faucet 1 includes a body 15, an electronic mixing valve 11, and a control module 13. By using the control module 13 to control the electronic mixing valve 11, the voice-controlled electronic faucet 1 is easily controlled to provide a required water flow. The specific structures and operation details will be explained in detail in FIG. 2.

Figure 2:
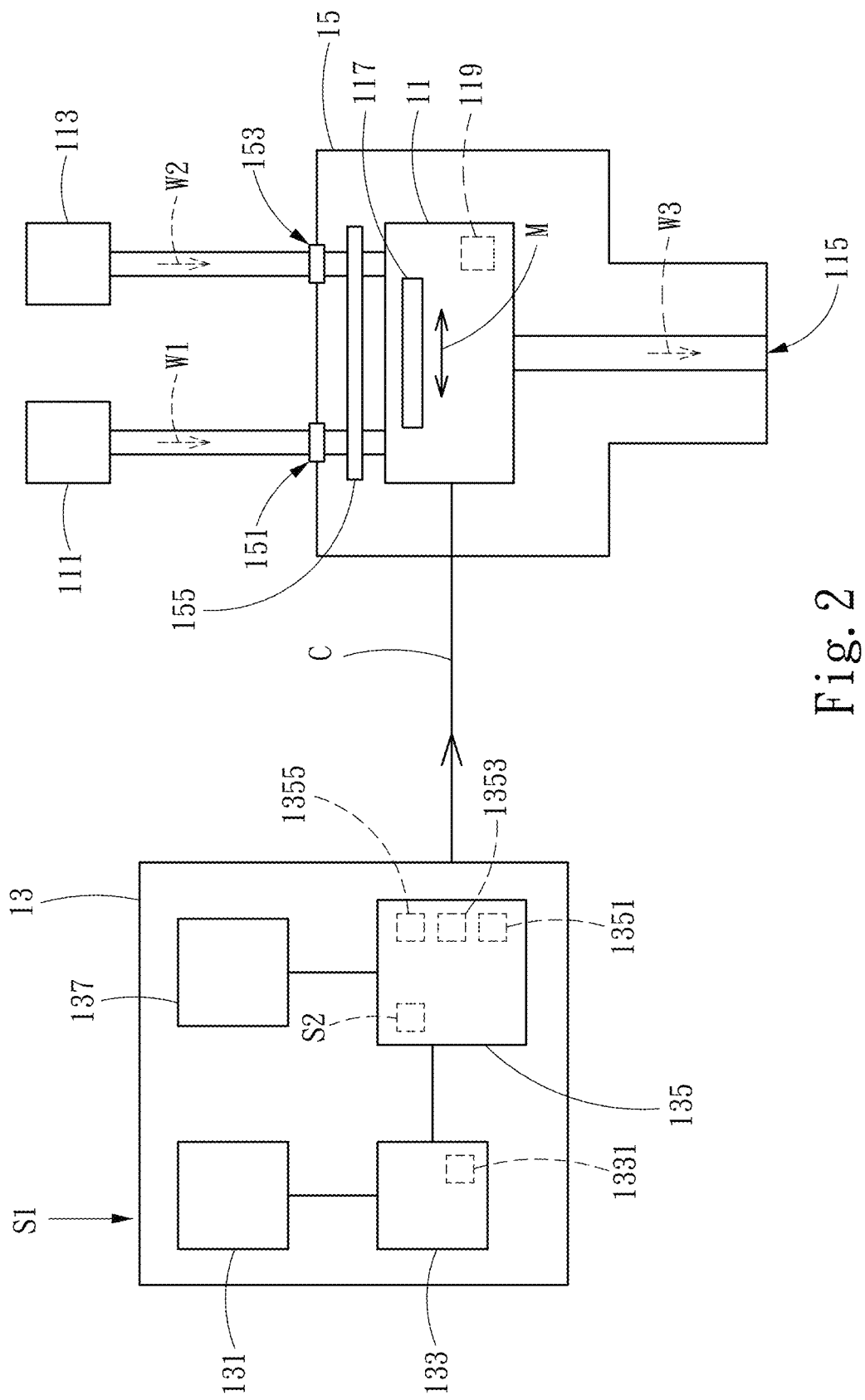
FIG. 2 is a functional block diagram of a voice-controlled electronic faucet according to one embodiment of the present invention.

Please refer to FIG. 2 for a functional block diagram of the voice-controlled electronic faucet 1 of the embodiment shown in FIG. 1 as well. The voice-controlled electronic faucet 1 includes the body 15, the electronic mixing valve 11, and the control module 13. The body 15 includes a cold water inlet 151, a hot water inlet 153, and a spout 115. The cold water inlet 151 and the hot water inlet 153 are fluidly connected to a cold water source 111 and a hot water source 113, respectively. The cold water inlet 151 and the hot water inlet 153 communicate with the spout 115. The electronic mixing valve 11 is disposed in the body 15. A valve body 117 of the electronic mixing valve 11 moves relative to the cold water inlet 151 and the hot water inlet 153 to control a fluid W1, W2, W3 from the cold water inlet 151 and the hot water inlet 153 to the spout 115.

In this embodiment, the cold water source 111 provides the fluid W1, such as cold water; the hot water source 113 provides the fluid W2, such as hot water; and the fluid W1 and the fluid W2 forms the fluid W3 after passing through the electronic mixing valve 11. The fluid W3 outputs from the spout 115. For example, the electronic mixing valve 11 is capable of controlling water temperature, rate of water flow, water discharge time, and water discharge type of the fluid W3. The electronic mixing valve 11 includes any possible mechanical structures, devices, and/or electronic components to control water temperature, rate of water flow, water discharge time and water discharge type of the fluid W3.

In this embodiment, the control module 13 does not have networking function, that is, the control module 13 is not connected to any processing circuits, networks, servers, and/or computers outside the control module 13. The control module 13 includes a sound receiving component 131, an echo elimination unit 133, and a processing unit 135. The sound receiving component 131 receives a sound S1, which comes from outside the voice-controlled electronic faucet 1. The echo elimination unit 133 is coupled to the sound receiving component 131. The echo elimination unit 133 processes an echo elimination 1331 to the sound S1. The processing unit 135 is coupled to the echo elimination unit 133 and receives an audio signal S2 after processing with the echo elimination 1331.

The processing unit 135 performs an offline voice recognition 1353 on the audio signal S2 based on a database 1351 and generates a comparison result 1355. The processing unit 135 outputs a control signal C to the electronic mixing valve 11 according to the comparison result 1355 for controlling the electronic mixing valve 11 to perform an action 119 correspondingly.

In one embodiment, the sound S1 is a voice generated by speaking of a user (not shown in the figure), and content of the sound S1 includes information such as water temperature, rate of water flow, water discharge time and water discharge type. The processing unit 135 outputs the control signal C corresponding to the content of the sound S1, and the electronic mixing valve 11 performs the action 119 to generate the fluid W3 correspondingly. Thereby, the user is capable of controlling water temperature, rate of water flow, time and type of water discharge of the voice-controlled electronic faucet 1 by voice.

It is worth noting that the processing unit 135 performs the offline voice recognition 1353 and generates the comparison result 1355 in an offline manner without connecting to any processing circuits, networks, servers and/or computers outside the voice-controlled electronic faucet 1, which can greatly improve the convenience of installation and use of the voice-controlled electronic faucet 1 and reduce the cost.

The echo elimination unit 133 eliminates echo in the sound S1, so that subsequent process operation can be performed for the audio signal S2. If the voice-controlled electronic faucet 1 is installed in a small space such as bathroom, toilet or kitchen, voice uttered by the user will generate a large echo. The sound S1 with echo causes great difficulty in subsequent recognition operation, and greatly reduces the recognition success rate and accuracy rate. Through disposition of the echo elimination unit 133, success rate and accuracy rate of voice recognition is greatly improved.

In addition, in one embodiment, a water flow modulator (not shown in the figure) is provided between the electronic mixing valve 11 and the spout 115. The water flow modulator is connected to the electronic mixing valve 11 with a mechanical structure and/or an electronic component. The electronic mixing valve 11 controls operation of the water flow modulator according to the control signal C. The water flow modulator modulates water discharging types of the fluid W3, such as density of water flow, foaminess of water flow, shape of water flow, etc. Thereby, the user is capable of controlling types of water discharge of the voice-controlled electronic faucet 1 by voice. Further, the water flow modulator is realized by, for example, an adjustable water softener, an adjustable water discharge bubbler, or a water shape modulator. In one embodiment, the water flow modulator simultaneously has functions of softening water, bubbling and modulating shape of water flow.

In one embodiment, the electronic mixing valve 11 includes a water quality modulator (not shown in the figure). The electronic mixing valve 11 controls operation of the water quality modulator according to the control signal C. The water quality modulator modulates water quality of the fluid W3, such as chlorine content, hardness and/or pH value. Thereby, the user is capable of controlling chlorine content, hardness and/or pH value of a discharging water (the fluid W3) of the voice-controlled electronic faucet 1 by voice. Specifically, the discharging water with lower chlorine content is healthier for the human body. The discharging water with different hardness has different effects on cleaning, cooking, drinking, etc. For example, as brewing different drinks or making various foods, water with different pH values provides a better quality. In another embodiment, the water quality modulator simultaneously has functions of dechlorination, hardness control and pH value control. Further, the water quality modulator is realized by, for example, an adjustable chlorine remover, an adjustable water hardness controller, or an adjustable pH controller. In addition to chlorine content, hardness and pH value, any possible types of water quality modulation are within the scope of the present invention.

In one embodiment, the cold water source 111 is realized by a tap water tower, and the hot water source 113 is realized by a water heater, but the present invention is not limited thereto. The valve body 117 of the electronic mixing valve 11 and a movement M of the valve body 117 shown in FIG. 2 are only schematic illustrations, and are not intended to limit structures or operation of the valve body 117. The electronic mixing valve 11 can implement the valve body 117 by any structures or devices that can be used to control the fluid W3. The sound receiving component 131 can be realized by, for example, a microphone. The control module 13, the echo elimination unit 133 and the processing unit 135 can be implemented by any possible circuits, electronic components and/or processors.

In one embodiment, the voice-controlled electronic faucet 1 further includes a near-end sensor 137, and the near-end sensor 137 is coupled to the processing unit 135. The near-end sensor 137 is used to detect approaching objects. When the user approaches the near-end sensor 137, the near-end sensor 137 generates a corresponding signal (not shown in the figure), and the processing unit 135 correspondingly generates a control signal C. The electronic mixing valve 11 is controlled to perform the action 119 according to the control signal C correspondingly. The action 119 can be, for example, water discharge, so as to achieve an object of automatic water discharge (i.e., the fluid W3) when the user is close to the voice-controlled electronic faucet 1.

It is worth noting that, when using the near-end sensor 137 to automatically discharge water, the user is capable of simultaneously controlling temperature as well as rate, time and type of water flow of the discharging water of the voice-controlled electronic faucet 1 by voice. Through the near-end sensor 137 cooperating with the sound receiving component 131 and the offline voice recognition 1353, water is discharged as soon as the user is close to the voice-controlled electronic faucet 1, and then various required water flow modulations is performed through voice, which can greatly improve the application and convenience of the voice-controlled electronic faucet 1.

In one embodiment, the near-end sensor 137 is an infrared sensor, but is not limited thereto. Positions of the near-end sensor 137 in FIG. 1 and FIG. 2 are merely illustrations, and are not intended to limit the present invention.

In one embodiment, the voice-controlled electronic faucet 1 further includes a manual temperature control switch 155. The manual temperature control switch 155 is disposed between the cold water source 111 and the hot water source 113 and the electronic mixing valve 11, or the manual temperature control switch 155 is disposed between the electronic mixing valve 11 and the spout 115. In this embodiment as shown in FIG. 1 and FIG. 2, the manual temperature control switch 155 disposing between the cold water source 111 and the hot water source 113 and the electronic mixing valve 11 is used as an example. The manual temperature control switch 155 is used to adjust mixing ratio of cold water and hot water in order to adjust temperature of the fluid W3. For example, when the manual temperature control switch 155 is rotated to one end side (not shown in the figures), rendering the fluid W3 output from the voice-controlled electronic faucet 1 to be hot water. For example, when the manual temperature control switch 155 is rotated to another end side (not shown in the figures), rendering the fluid W3 output from the voice-controlled electronic faucet 1 to be cold water. Thereby, the voice-controlled electronic faucet 1 can better meet requirements of the user.

Figure 3:
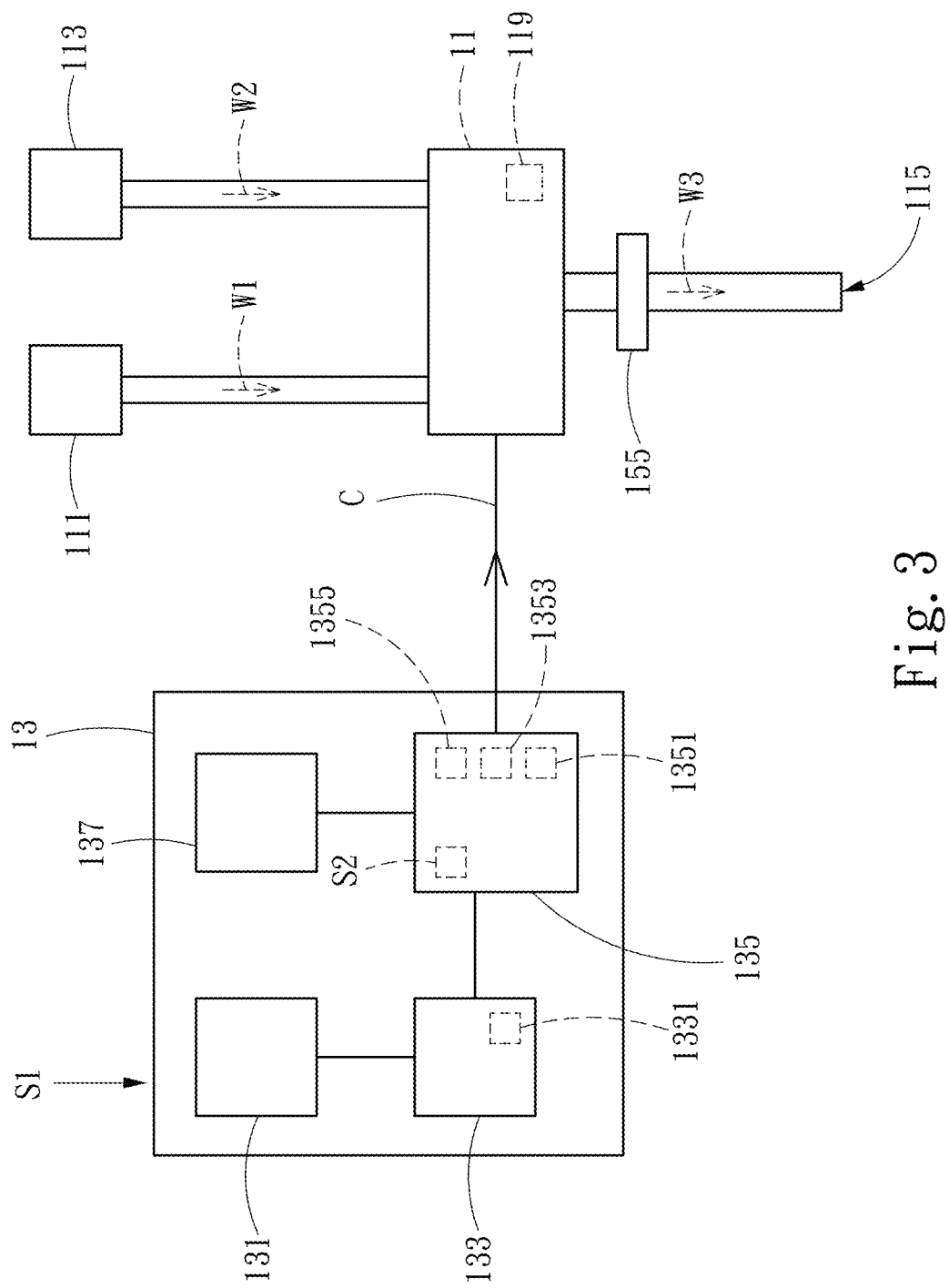
FIG. 3 is a functional block diagram of a voice-controlled electronic faucet assembly according to one embodiment of the present invention.

Please refer to FIG. 3 for a functional block diagram of a voice-controlled electronic faucet assembly 2 according to one embodiment of the present invention. Structures and functions of the voice-controlled electronic faucet assembly 2 of this embodiment are similar to that of the voice-controlled electronic faucet 1 shown in FIG. 1 and FIG. 2. This embodiment differs from the embodiment shown in FIG. 1 and FIG. 2 is that the voice-controlled electronic faucet assembly 2 does not include the body 15, the cold water inlet 151, and the hot water inlet 153. The voice-controlled electronic faucet assembly 2 is installed in any possible devices, housings or facilities, and is not limited to the body 15 shown in FIG. 1 and FIG. 2. The voice-controlled electronic faucet assembly 2 can have more diverse and possible applications.

In the voice-controlled electronic faucet assembly 2 shown in FIG. 3, the manual temperature control switch 155 disposing between the electronic mixing valve 11 and the spout 115 is used as an example.

Figure 4:
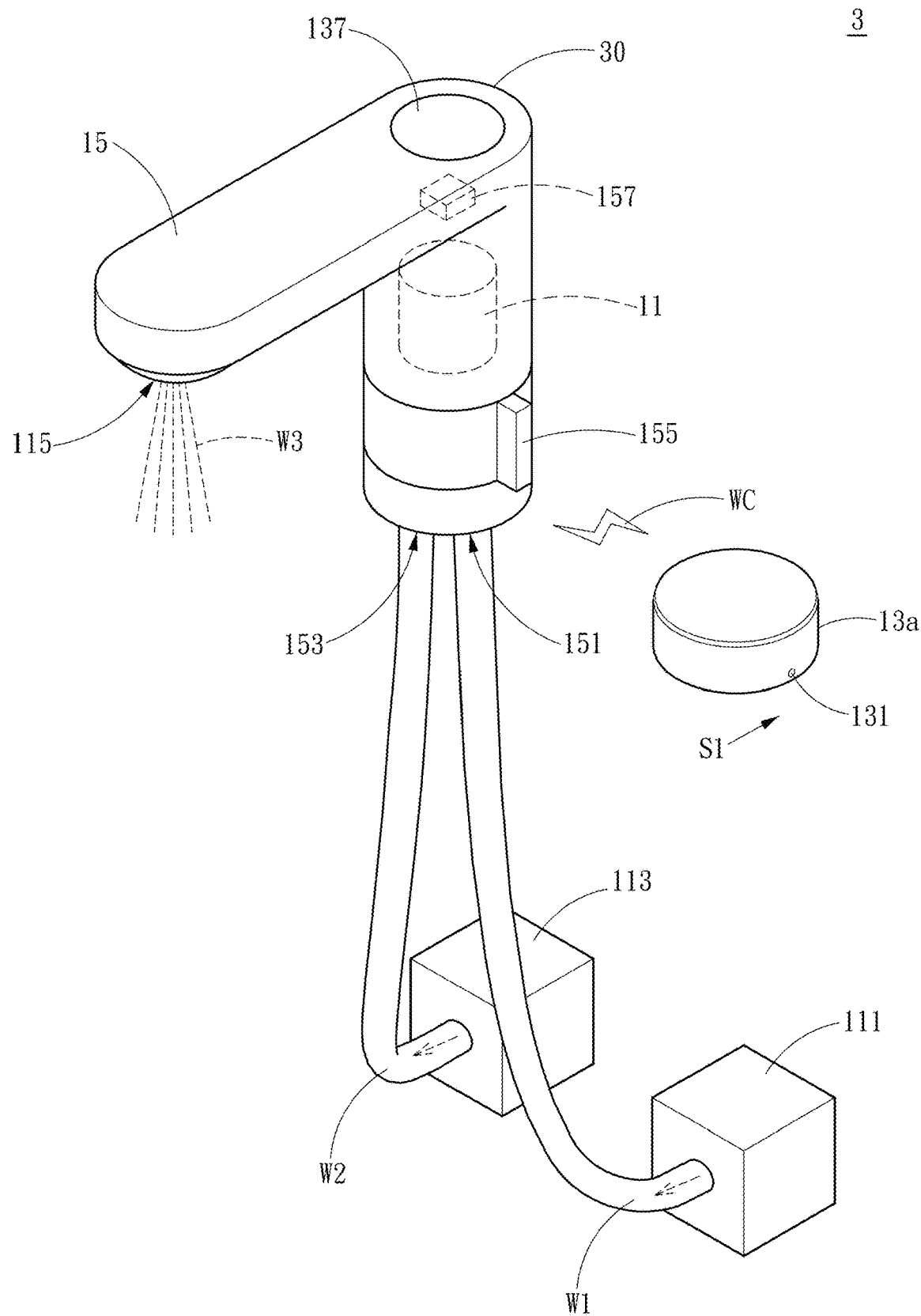
FIG. 4 is a perspective view of a voice-controlled electronic faucet module according to one embodiment of the present invention.

Please refer to FIG. 4 for a perspective view of a voice-controlled electronic faucet module 3 according to one embodiment of the present invention. Structures and functions of the voice-controlled electronic faucet module 3 of this embodiment are similar to that of the voice-controlled electronic faucet 1 shown in FIG. 1 and FIG. 2. The voice-controlled electronic faucet module 3 includes a voice-controlled electronic faucet 30 and a sensing device 13a. The same components of the voice-controlled electronic faucet module 3 and the voice-controlled electronic faucet 1 have similar structures and functions.

Figure 5:
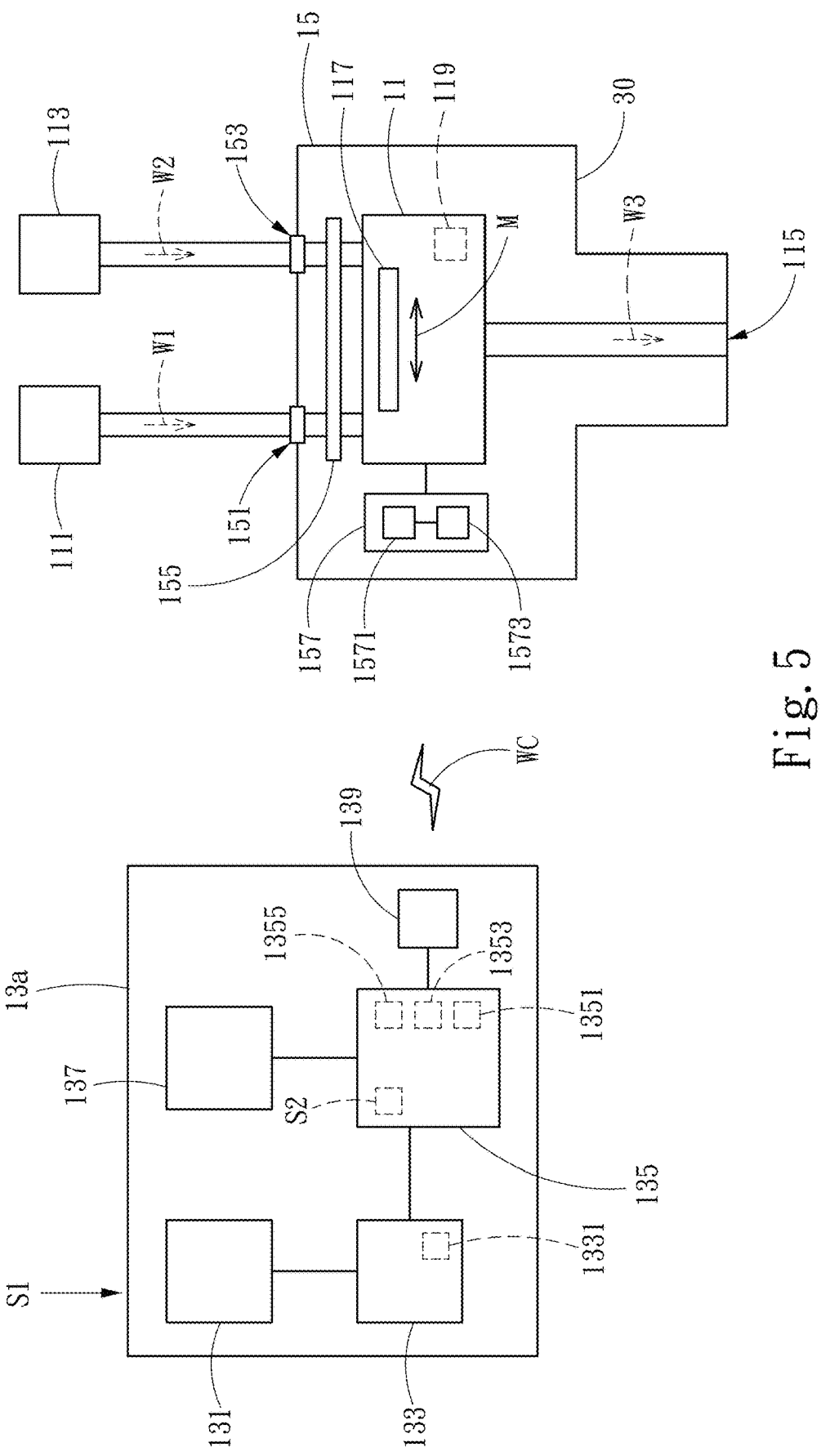
FIG. 5 is a functional block diagram of a voice-controlled electronic faucet module according to one embodiment of the present invention.

Please refer to FIG. 5 for a functional block diagram of the voice-controlled electronic faucet module 3 of the embodiment shown in FIG. 4. The voice-controlled electronic faucet 30 includes a body 15, an electronic mixing valve 11 and a first control module 157. The body 15 includes a cold water inlet 151, a hot water inlet 153 and a spout 115. The cold water inlet 151 and the hot water inlet 153 are fluidly connected to a cold water source 111 and a hot water source 113, respectively. The cold water inlet 151 and the hot water inlet 153 communicate with the spout 115.

The electronic mixing valve 11 is disposed in the body 15. A valve body 117 of the electronic mixing valve 11 moves relative to the cold water inlet 151 and the hot water inlet 153 to control the fluid W1, W2, W3 from the cold water inlet 151 and the hot water inlet 153 to the spout 115. The first control module 157 is electrically connected to the electronic mixing valve 11. The first control module 157 includes a first processing unit 1571 and a first transceiver 1573 electrically connected to the first processing unit 1571.

The sensing device 13a and the voice-controlled electronic faucet 30 are separately disposed. The sensing device 13a includes a sound receiving component 131, an echo elimination unit 133, a processing unit 135, and a second transceiver 139. For convenience of description, in this embodiment, the processing unit 135 is a second processing unit. The sound receiving component 131 receives a sound S1. The echo elimination unit 133 is coupled to the sound receiving component 131 and processes an echo elimination 1331 to the sound S1. The processing unit 135 (the second processing unit) is coupled to the echo elimination unit 133 and receives an audio signal S2 after processing with the echo elimination 1331. The second transceiver 139 is coupled to the processing unit 135.

The processing unit 135 performs an offline voice recognition 1353 on the audio signal S2 based on a database 1351 and generates the comparison result 1355. The processing unit 135 outputs a control signal WC according to the comparison result 1355. In this embodiment, the control signal WC is a wireless signal. The second transceiver 139 wirelessly transmits the control signal WC to the first transceiver 1573. The first processing unit 1571 controls the electronic mixing valve 11 to perform an action 119 correspondingly according to the control signal WC. Functions and effects of the control signal WC in this embodiment are similar to that of the control signal C in the embodiment shown in FIG. 2 and FIG. 3, and the details will not be described here again.

The sensing device 13a and the voice-controlled electronic faucet 30 of this embodiment are separately disposed, and the control signal WC is transmitted wirelessly. In one embodiment, the sensing device 13a is installed at a different location independently of the voice-controlled electronic faucet 30, for example, the sensing device 13a can be installed at a location that is not easily splashed by water to avoid possible damage and increase service life. Alternatively, the sensing device 13a can be installed at a position where the sound S1 is easier to be received, so as to improve the convenience of use and the accuracy of voice recognition.

In addition, the first transceiver 1573 and the second transceiver 139 are implemented by a 433 MHz wireless device, a 915 MHz wireless device, a 2.4 GHz wireless device, a 5 GHz wireless device, or a Bluetooth device, but the present invention is not limited thereto.

In summary, the voice-controlled electronic faucet, the voice-controlled electronic faucet assembly and the voice-controlled electronic faucet mentioned in the above embodiments are capable of performing voice recognition in an offline manner through disposition of the control module and the electronic mixing valve, which can greatly improve the convenience of installation and use of the voice-controlled electronic faucet, the voice-controlled electronic faucet assembly and the voice-controlled electronic faucet module, and reduce the cost.

What is claimed is:

1. A voice-controlled electronic faucet assembly including:
   an electronic mixing valve, fluidly connected to a cold water source and a hot water source;
   a spout, fluidly connected to the electronic mixing valve; and
   a control module, without networking function, the control module including a sound receiving component, an echo elimination unit and a processing unit, the sound receiving component receiving a sound, the echo elimination unit coupled to the sound receiving component and processing an echo elimination to the sound, and the processing unit coupled to the echo elimination unit and receiving an audio signal after processing with the echo elimination;
   wherein the processing unit performs an offline voice recognition on the audio signal based on a database and generates a comparison result, and the processing unit outputs a control signal to the electronic mixing valve according to the comparison result for controlling the electronic mixing valve to perform an action correspondingly.

2. The voice-controlled electronic faucet assembly as claimed in claim 1, wherein the voice-controlled electronic faucet assembly further includes a near-end sensor coupled to the processing unit.

3. The voice-controlled electronic faucet assembly as claimed in claim 1, wherein the voice-controlled electronic faucet assembly further includes a manual temperature control switch fluidly connected between the electronic mixing valve and the spout.

4. A voice-controlled electronic faucet including:
   a body, including a cold water inlet, a hot water inlet and a spout, the cold water inlet and the hot water inlet respectively fluidly connected to a cold water source and a hot water source, the cold water inlet and the hot water inlet communicating with the spout;
   an electronic mixing valve, disposed in the body, the electronic mixing valve including a valve body moving relative to the cold water inlet and the hot water inlet to control a fluid from the cold water inlet and the hot water inlet to the spout; and
   a control module, without networking function, the control module including a sound receiving component, an echo elimination unit, and a processing unit, the sound receiving component receiving a sound, the echo elimination unit coupled to the sound receiving component and processing an echo elimination on the sound, and the processing unit coupled to the echo elimination unit and receiving an audio signal after processing with the echo elimination;
   wherein the processing unit performs an offline voice recognition on the audio signal based on a database and generates a comparison result, and the processing unit outputs a control signal to the electronic mixing valve according to the comparison result for controlling the electronic mixing valve to perform an action correspondingly.

5. The voice-controlled electronic faucet as claimed in claim 4, wherein the voice-controlled electronic faucet further includes a near-end sensor coupled to the processing unit.

6. The voice-controlled electronic faucet as claimed in claim 4, wherein the voice-controlled electronic faucet further includes a manual temperature control switch fluidly connected between the electronic mixing valve and the spout.

7. A voice-controlled electronic faucet module including a voice-controlled electronic faucet and a sensing device, wherein the voice-controlled electronic faucet includes:
   a body, including a cold water inlet, a hot water inlet and a spout, the cold water inlet and the hot water inlet fluidly connected to a cold water source and a hot water source respectively, the cold water inlet and the hot water inlet communicating with the spout;
   an electronic mixing valve, disposed in the body, the electronic mixing valve including a valve body moving relative to the cold water inlet and the hot water inlet to control a fluid from the cold water inlet and the hot water inlet to the spout; and
   a first control module, electrically connected to the electronic mixing valve, the first control module including a first processing unit and a first transceiver electrically connected to the first processing unit;
   wherein the sensing device and the voice-controlled electronic faucet are separately disposed, the sensing device includes a sound receiving component, an echo elimination unit, a second processing unit and a second transceiver, the sound receiving component receives a sound, the echo elimination unit is coupled to the sound receiving component and processes an echo elimination to the sound, the second processing unit is coupled to the echo elimination unit and receives an audio signal after processing with the echo elimination, and the second transceiver is coupled to the second processing unit; and
   wherein the second processing unit performs an offline voice recognition on the audio signal based on a database and generates a comparison result, the second processing unit outputs a control signal according to the comparison result, the second transceiver transmits the control signal to the first transceiver wirelessly, and the first processing unit controls the electronic mixing valve to perform an action correspondingly according to the control signal.

8. The voice-controlled electronic faucet module as claimed in claim 7, wherein the voice-controlled electronic faucet further includes a near-end sensor coupled to the second processing unit.

9. The voice-controlled electronic faucet module as claimed in claim 7, wherein the voice-controlled electronic faucet includes a manual temperature control switch fluidly connected between the electronic mixing valve and the spout.

* * * * *